United States Patent
Kooshki et al.

(10) Patent No.: US 12,068,800 B2
(45) Date of Patent: Aug. 20, 2024

(54) ENERGY EFFICIENT CELL-LESS RADIO ACCESS NETWORK AND METHODS FOR USE THEREWITH

(71) Applicant: ISRD Sp. z o.o., Piaseczno (PL)

(72) Inventors: Farinaz Kooshki, Piaseczno (PL); Ana Garcia Armada, Leganes (ES); Md Munjure Mowla, Rajshahi (BD); Adam Dawid Flizikowski, Bydgoszcz (PL); Slawomir Pietrzyk, Piaseczno (PL)

(73) Assignee: ISAD Sp. z o.o., Piaseczno (PL)

( * ) Notice: Subject to any disclaimer, the term of this patent is extended or adjusted under 35 U.S.C. 154(b) by 0 days.

(21) Appl. No.: 18/484,821

(22) Filed: Oct. 11, 2023

(65) Prior Publication Data

US 2024/0146429 A1    May 2, 2024

Related U.S. Application Data

(60) Provisional application No. 63/379,524, filed on Oct. 14, 2022.

(51) Int. Cl.
| | |
|---|---|
| *H04B 17/382* | (2015.01) |
| *H04B 17/327* | (2015.01) |
| *H04W 28/08* | (2023.01) |
| *H04W 40/00* | (2009.01) |

(52) U.S. Cl.
CPC ......... *H04B 17/382* (2015.01); *H04B 17/327* (2015.01); *H04W 28/0983* (2020.05); *H04W 40/005* (2013.01)

(58) Field of Classification Search
CPC ............ H04W 40/005; H04W 28/0983; H04B 17/327; H04B 17/382
See application file for complete search history.

(56) References Cited

U.S. PATENT DOCUMENTS

2022/0210794 A1    6/2022   Pietrzyk et al.

FOREIGN PATENT DOCUMENTS

| CN | 107087284 A | 8/2017 |
| CN | 113473499 A | 10/2021 |

OTHER PUBLICATIONS

J. Kim, H.-W. Lee, and S. Chong, "Traffic-aware energy-saving base station sleeping and clustering in cooperative networks," IEEE Transactions on Wireless Communications, vol. 17, No. 2, pp. 1173-1186, 2018.

(Continued)

*Primary Examiner* — James P Duffy
(74) *Attorney, Agent, or Firm* — Garlick & Markison; Bruce E. Stuckman

(57) ABSTRACT

A radio access network (RAN) operates by: determining an initial RU/UE association that allocates the plurality of UEs among the plurality of RUs via reference signal received power (RSRP) data received from the plurality of RUs; receiving RU conditions data corresponding to a set of RU conditions associated with the plurality of RUs; receiving RU constraint data associated with the plurality of RUs; assigning, via at least one iterative RU sleeping loop and based on the initial RU/UE association, the RU conditions data and the RU constraint data, an active mode to a first subset of the plurality of RUs and a sleep mode to a second subset of the plurality of RUs; and updating a dynamic RU/UE association based on the first subset of the plurality of RUs and the second subset of the plurality of RUs.

20 Claims, 13 Drawing Sheets

(56) References Cited

OTHER PUBLICATIONS

3GPP, "LTE, Evolved Universal Terrestrial Radio Access (E-UTRA), Physical layer, Measurements," ETSI TS 136 214 V14.2.0, Dec. 2017.

A. Dataesatu, P. Boonsrimuang, K. Mori, and P. Boonsrimuang, "Energy efficiency enhancement in 5g heterogeneous cellular networks using system throughput based sleep control scheme," in 2020 22nd International Conference on Advanced Communication Technology (ICACT), 2020, pp. 549-553.

A. Ebrahim and E. Alsusa, "Interference and resource management through sleep mode selection in heterogeneous networks," IEEE Transactions on Communications, vol. 65, No. 1, pp. 257-269, 2017.

A. Mughees, M. Tahir, M. A. Sheikh, and A. Ahad, "Towards energy efficient 5g networks using machine learning: Taxonomy, research challenges, and future research directions," IEEE Access, vol. 8, pp. 187498-187522, 2020.

A. Papazafeiropoulos, H. Q. Ngo, P. Kourtessis, S. Chatzinotas, and J. M. Senior, "Towards optimal energy efficiency in cell-free massive mimo systems," IEEE Transactions on Green Communications and Networking, vol. 5, No. 2, pp. 816-831, 2021.

B. Shen, Z. Lei, X. Huang, and Q. Chen, "An interference contribution rate based small cells on/off switching algorithm for 5g dense heterogeneous networks," IEEE Access, vol. 6, pp. 29757-29769, 2018.

C. Bouras and G. Diles, "Energy efficiency in sleep mode for 5g femtocells," in 2017 Wireless Days, 2017, pp. 143-145.

D. Sudhakar and D. Sunehra, "A traffic-aware and power-saving base station switch off method for cellular networks," in 2022 7th International Conference on Communication and Electronics Systems (ICCES), 2022, pp. 12-15.

Deutsche Telekom, Orange, Telefónica, TIM and Vodafone, "Open RAN Technical Priority Release 2—Focus on Energy Efficiency," Open RAN MOU, Mar. 2022.

F. Marzouk, J. P. Barraca, and A. Radwan, "On energy efficient resource allocation in shared rans: Survey and qualitative analysis," IEEE Communications Surveys Tutorials, vol. 22, No. 3, pp. 1515-1538, 2020.

H. A. Ammar, R. Adve, S. Shahbazpanahi, G. Boudreau, and K. V. Srinivas, "User-centric cell-free massive mimo networks: A survey of opportunities, challenges and solutions," IEEE Communications Surveys & Tutorials, vol. 24, No. 1, pp. 611-652, 2021.

H. Q. Ngo, L.-N. Tran, T. Q. Duong, M. Matthaiou, and E. G. Larsson, "On the total energy efficiency of cell-free massive mimo," IEEE Transactions on Green Communications and Networking, vol. 2, No. 1, pp. 25-39, 2018.

ITU-R, "Guidelines for evaluation of radio interface technologies for IMT2020," Tech. Report (TR-M.2412-0), Dec. 2017.

J. A. Ayala-Romero, J. J. Alcaraz, A. Zanella, and M. Zorzi, "Online learning for energy saving and interference coordination in hetnets," IEEE Journal on Selected Areas in Communications, vol. 37, No. 6, pp. 1374-1388, 2019.

J. García-Morales, G. Femenias, and F. Riera-Palou, "Energy-efficient access-point sleep-mode techniques for cell-free mmwave massive mimo networks with non-uniform spatial traffic density," IEEE Access, vol. 8, pp. 137587-137605, 2020.

J. Opadere, Q. Liu, and T. Han, "Energy-efficient rrh sleep mode for virtual radio access networks," in GLOBECOM 2017—2017 IEEE Global Communications Conference, 2017, pp. 1-6.

M. M. Mowla, I. Ahmad, D. Habibi, and Q. V. Phung, "A green communication model for 5g systems," IEEE Transactions on Green Communications and Networking, vol. 1, No. 3, pp. 264-280, 2017.

M. Osama, S. El Ramly, and B. Abdelhamid, "Interference mitigation and power minimization in 5g heterogeneous networks," Electronics, vol. 10, No. 14, p. 1723, 2021.

M. Usama and M. Erol-Kantarci, "A survey on recent trends and open issues in energy efficiency of 5g," Sensors, vol. 19, No. 14, p. 3126, 2019.

Marcin Hoffmann, "O-RAN as an Enabler for Energy Efficiency in 5G Networks," Rimedo Labs, Poland.

S. Wu, R. Yin, and C. Wu, "Heterogeneity-aware energy saving and energy efficiency optimization in dense small cell networks," IEEE Access, vol. 8, pp. 178670-178684, 2020.

T. Han, X. Ge, L. Wang, K. S. Kwak, Y. Han, and X. Liu, "5g converged cell-less communications in smart cities," IEEE Communications Magazine, vol. 55, No. 3, pp. 44-50, 2017.

T. Van Chien, E. Björnson, and E. G. Larsson, "Joint power allocation and load balancing optimization for energy-efficient cell-free massive mimo networks," IEEE Transactions on Wireless Communications, vol. 19, No. 10, pp. 6798-6812, 2020.

V. G. Auer, and O. Blume, "Energy efficiency analysis of the reference systems, areas of improvements and target breakdown (earth)," Tech. Report, Dec. 2012.

Y. Zhang, Y. Xu, Y. Sun, Q. Wu, and K. Yao, "Energy efficiency of small cell networks: Metrics, methods and market," IEEE Access, vol. 5, pp. 5965-5971, 2017.

Z. Niu, Y. Wu, J. Gong, and Z. Yang, "Cell zooming for cost-efficient green cellular networks," IEEE Communications Magazine, vol. 48, No. 11, pp. 74-79, 2010.

Z. Tong, F. Xu, and C. Zhao, "A base station on-off switch algorithm with grid-based traffic map in dense 5g network," in 2017 IEEE/CIC International Conference on Communications in China (ICCC), 2017, pp. 1-6.

International Searching Authority; International Search Report and Written Opinion; International Application No. PCT/US2032/076649; Jan. 30, 2024; 8 pgs.

Samsung; Network Slicing; Technical White Paper; Apr. 22, 2020; pp. 4-19.

Umesh et al.; Overview of O-RAN Fronthaul Specifications; NTT DOCOMO Technical Journal; Jul. 2019; pp. 46-59; vol. 21, No. 1.

400

ENERGY EFFICIENT CELL-LESS RADIO ACCESS NETWORK AND METHODS FOR USE THEREWITH

CROSS REFERENCE TO RELATED APPLICATIONS

The present U.S. Utility Patent Application claims priority pursuant to 35 U.S.C. § 119(e) to U.S. Provisional Application No. 63/379,524, entitled "ENERGY EFFICIENT CELL-LESS RADIO NETWORK AND METHODS FOR USE THEREWITH", filed Oct. 14, 2022, which is hereby incorporated herein by reference in its entirety and made part of the present U.S. Utility Patent Application for all purposes.

FIELD OF THE DISCLOSURE

The subject disclosure relates to control of wireless communication networks.

BRIEF DESCRIPTION OF THE DRAWINGS

Reference can now be made to the accompanying drawings, which are not necessarily drawn to scale, and wherein.

DETAILED DESCRIPTION

Figure 1A:
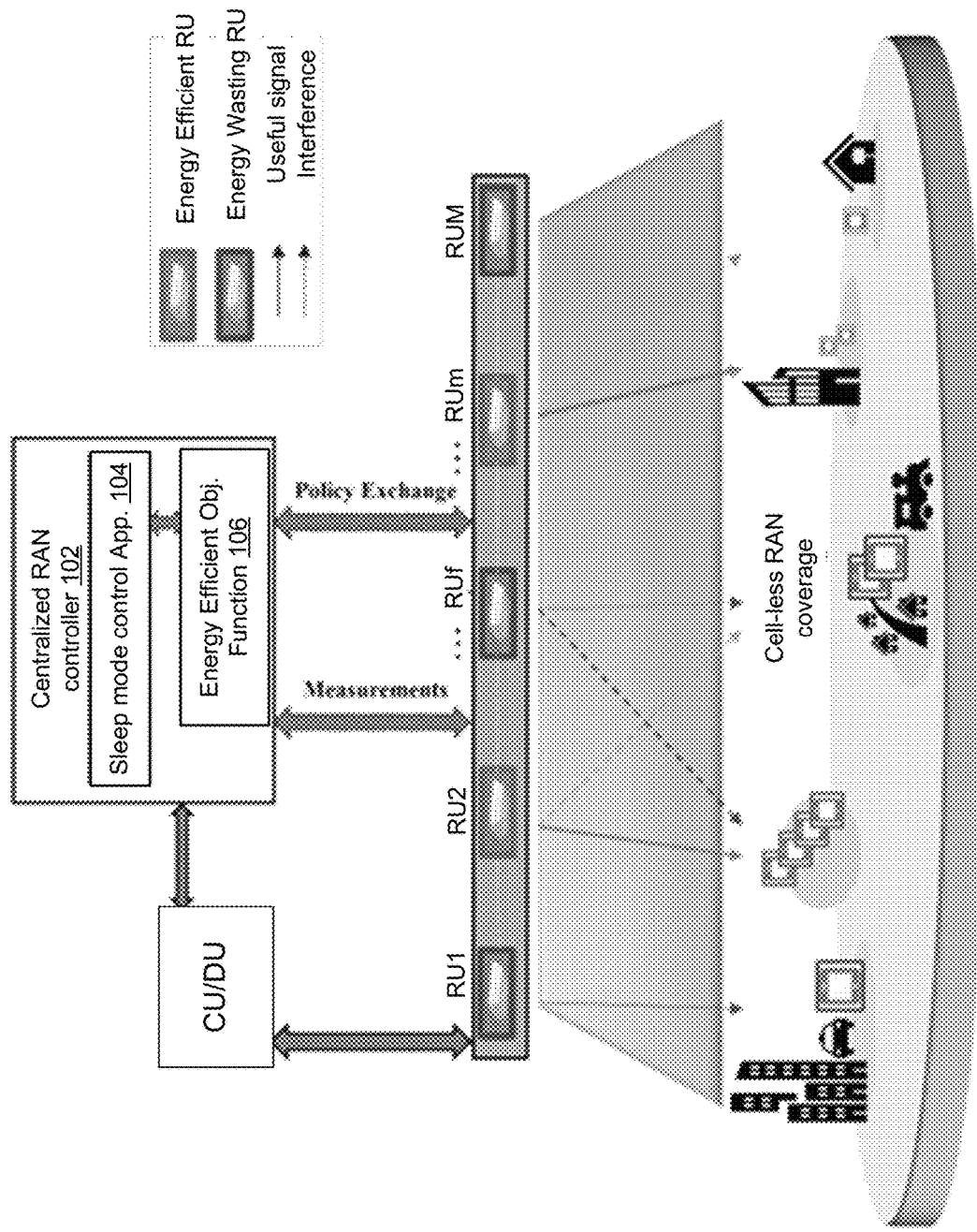
FIG. 1A is a pictorial/block diagram illustrating an example, non-limiting example of a radio access network (RAN).

One or more examples are now described with reference to the drawings, wherein like reference numerals are used to refer to like elements throughout. In the following description, for purposes of explanation, numerous details are set forth in order to provide a thorough understanding of the various examples. It is evident, however, that the various examples can be practiced without these details (and without applying to any particular networked environment or standard).

I. Introduction

Escalating traffic demands for different use cases and new applications of the evolving mobile communication generation (i.e., 5G and beyond (B5G)) has led to an action requirement from the operators to expand their networks in order to support more capacity. At the same time, the increased traffic is consuming huge amount of energy for the wireless networks, which impacts the greenhouse effect significantly. Research communities from both academia and industry are now focusing on novel technologies, architecture, infrastructures, and solutions to execute the capacity expansion plan while minimizing power consumption as possible from both access and backhaul networks.

Recently, a new radio access network (RAN) architecture known as cell-less (e.g., a cell-free network or other cooperative network architecture that shares radio resources) has been approached to provide high spectral efficiency, flexible and cost-efficient deployment, ensure high quality of service (QoS), and support low path loss propagation conditions. In the cell-less architecture, the cell boundaries are removed from the user equipment (UE) viewpoint. However, it is not practical to serve all UEs by the entire available base station (BS) transmitters due to the capacity constraint of a particular BS transmitter. In order to have a practical and feasible network architecture, technical solutions adoptable to the architecture are needed to meet the key performance indicators (KPIs) and afford the resource consumption such as energy. At the same time, the industry players are interested in novel architectures having green implementations and otherwise improving network energy efficiency (EE) to reduce power consumption. The Open RAN solution has been considered as an enabler for EE in 5G networks. Therefore, it requires novel technologies being customized for an energy efficient implementation. The key contributing operators in Open RAN just started to focus on energy performance parameters and solutions for candidate technologies and architectures. Having a different traffic load over time based on the user condition diversity, leads to huge amounts of wasted energy by keeping the access points (APs) in the same transmitting power status all the time. Considering sleep mode control as a recognized feature to improve EE, will enhance the network EE and promote proper management of energy utilization in APs.

In this disclosure, various examples (which may also be referred to as embodiments) propose energy-efficient sleep mode schemes for a cell-less RAN architecture in 5G and beyond 5G networks. This disclosure proposes a novel energy-efficient enhancement approach i.e., (3×E), with various optional features and example implementations that can collectively be referred to as a "scheme", that can utilize intelligent control over access points (APs) to activate two-step sleep modes (e.g., non-conditional and conditional) for the cell-less RAN architecture. Various examples control the interference at the dense environment (in terms of number of users) resulting in a stable performance enhancement compared to existing works. Hence, the intelligent interference management criteria utilized in the 3×E scheme optimize the network energy efficiency (EE) in highly loaded scenarios, as well as in scenarios with lower load, irrespective of the user density. Simulation results depict that the network energy efficiency is improved up to 60% with respect to a baseline algorithm without sleep mode control.

Through the solutions proposed to date, energy efficiency performance has been an important topic for novel architectures, such as cell-less RAN, among the enabling technologies for 5G and beyond networks. One target of this work is to present a customized energy-efficient technique which can make the cell-less network implementation practically preferable from the power consumption and implementation complexity point of view for new Open RAN network solutions.

The solutions proposed in the existing literature to date are not comprehensive and not well adapted to the cell-less architecture in which there are no cell boundaries, where the UE is viewing the entire radio resources as a common pool and where the RAN is transparent from this perspective. The UE does not need to do handover in cell-less architecture and thanks to this, the cooperative association scheme could be implemented without extra signaling due to handover procedures but with higher energy-efficient performance through applying a sleep mode selection scheme customized for a cell-less design. In this disclosure, we consider the fact that the UE needs to be able to be served by any particular radio resources (e.g. RU, PRB) within the time intervals in an energy-efficient way.

In this disclosure, we also consider the interference contribution of the RUs and its direct impact on energy efficiency. An energy-efficient scheme is proposed with the aim of optimizing the total network EE and the minimum EE of the RUs in addition to managing their interference contribution. This together with an efficient customization based on the network density will enhance the network EE significantly and outperform the previous works. The main advantage of the proposed energy efficiency scheme is the fact that it is capable of optimizing the minimum individual RU and network EE within different user density setups thanks to an applied strategy for selecting sufficient RU candidates to save energy and enhance data transmissions per energy unit. Hence, the scheme can save energy not only in the non-busy-hours, but also enhance energy efficiency in busy hours. This is in contrast to other proposed techniques which do not assure saving energy efficiently when the load increases as a result of the user density increments. Although it may be needed to re-associate a higher number of users from highly loaded sleeping RUs in various examples compared to other techniques, the proposed criteria will manage and avoid high traffic loss and performance degradation instead. In addition to this, handover procedures are removed as a benefit of using the cell-less architecture.

One or more embodiments further improves upon existing RAN architectures by:
Presenting an energy-efficient scheme in the cell-less architecture towards the practical deployment in 5G and beyond 5G networks. This can include a two-step sleep mode selection (i.e., non-conditional phase and conditional phase) with an intelligent controller that dynamically updates the user and RU association and switches the unnecessary RUs to sleep.
Helping to control the interference at the dense environment in a way that data transmission from RU is performed only if it is beneficial for the EE increment of the network. The simulation results show that the network throughput and EE are improved for the proposed scheme as compared with the conventional algorithms.

II. System Model

One or more embodiments assume a cell-less architecture of the RAN for a dense scenario depicted in FIG. 1A where the UEs are connecting to the entire pool radio resources without being limited by the cell boundaries and they experience the RAN as a common unique zone. The radio access network transports data received from content sources or other data content transport clients, and/or data conveying other communications between wireless communication devices. This data can include, e.g., audio, video, graphics, text or other media, applications, control information, billing information, network management information and/or other data. The radio access network with core network operates to manage access by the wireless communication devices, provides billing and network management and supports other network and control functions and can include other network elements that are not specifically shown.

In various examples, the elements of the radio access network can be implemented in conjunction with an open radio access network (O-RAN) cloud RAN (CRAN), virtualized RAN (VRAN), distributed/disaggregated RAN (DRAN), Open RAN or other standard that is based on interoperability and standardization of RAN elements and, for example, includes a unified interconnection standard for white-box hardware and open source software elements from different vendors to provide an architecture that integrates a modular base station software stack on commercial off-the-shelf (COTS) hardware which allows baseband and radio unit components from discrete suppliers to operate seamlessly together. For example, the elements of the radio access network are interconnected via transport links that can be wired, optical and/or wireless links that, for example, support encapsulated and encrypted transport. These transport links can operate via F1,E2, A1, O1, evolved packet core (EPC), next generation core (NGC), 5G core or via another network protocol or standard.

The centralized RAN controller 102 that includes a sleep mode control application 104 and energy efficiency objective function 106 and that operates in an architecture where the processing via the distributed unit/centralized unit (DU/CU) combination supports a plurality of RUs with, for example, multiple DUs attaching to a single CU and/or multiple RUs attaching to single DU. The DU and CU can be collocated—but they do not have to be. In various examples, CUs, DUs and RUs communicate control plane and user plane signaling from the UEs to the core network. The CUs/DUs/RUs operate in conjunction with a radio access network protocol stack that can include a physical (PHY) layer, media access control (MAC) layer, radio link control (RLC) layer and one or more upper layers such as a Packet Data Convergence Protocol (PDCP) layer and a service data adaptation protocol (SDAP) layer.

The centralized RAN controller 102 can be implemented via a RAN intelligent controller (MC) or other network device that includes one or more network interfaces for communicating with the CU/DU and RUs and/or the core network, and a processor and an associated memory that stores operational instructions that configure the centralized RAN controller to perform its various functions.

Figure 1B:
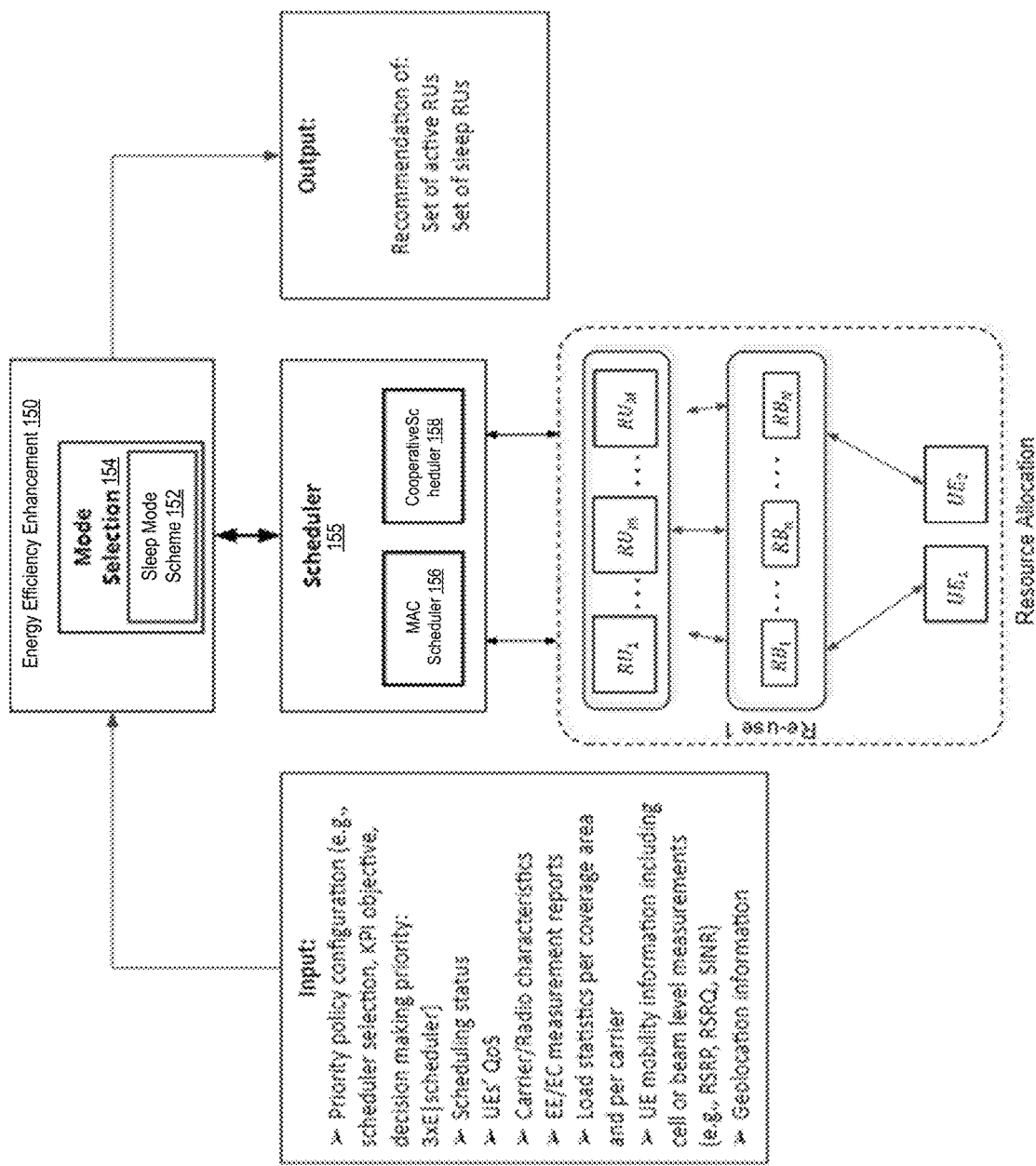
FIG. 1B is a pictorial/block diagram illustrating an example, non-limiting example of a radio access network (RAN).

In various examples, the functions implemented by the centralized RAN controller can include a scheduler or other radio resource manager that operates to support scheduling, power and resource block allocation, remote radio head (RRH) association and/or other resource management of the RAN. The radio resources in this cell-less approach can be treated as a common unique pool containing the entire available resources of all RRHs and Time-Frequency Resource Blocks (RBs) which can improve the user-resource assignment freedom and subsequently increase system performance. For example, disaggregated RAN, inspired from the Open RAN architecture, having disaggregated RUs, centralized unit (CU), distributed unit (DU), is considered, where each RU shows similar attributes to a base station (BS)/access point (AP). The users associated with each RU may be served randomly or by any well-established scheduling technique. Examples of a schedule and techniques for cooperative scheduling are presented in U.S. Patent Publication 2022/0210794 entitled, COOPERATIVE RADIO RESOURCE SCHEDULING IN A WIRELESS COMMUNICATION NETWORK AND METHODS FOR USE THEREWITH, that was published on Jun. 30, 2022, the contents of which are incorporated by reference for any and all purposes. This will give extra advantage of improving the network throughput due to additional interference management with higher granularity of RBs. The centralized RAN controller supports the coordination of RAN and the network information exchanging and storage. The UEs may be re-associated to different RUs at each transmission time interval (TTI) after N TTIs, where N is a fixed integer greater than 1 and/or after M TTIs, where M is a dynamically selected integer greater than 0. As will be discussed in greater detail in the discussions that follow, the functions of the centralized RAN control further include a sleep mode control application that, for example, operates in accordance with an energy efficiency objective function, to control which RUs are active and which RUs are asleep at any given time (e.g., each TTI, after K TTIs, where K is a fixed greater than 1 and/or after L TTIs, where L is a dynamically selected integer greater than 0). The recommendation of mode selection (e.g., a kind of sleep modes micro, light, deep, whole base station, etc.) can be complementary to the scheduler for final decisions as shown in a further example in FIG. 1B that presents an energy efficiency enhancement (3×E) 150 that includes mode selection 154 and sleep mode scheme 152 that interact with scheduler 155 that can include MAC scheduler 156 and/or cooperative scheduler 158 that operate based on one or more of the inputs shown to generate output in the form of recommendations of: a set of active RUs, and/or a set of sleep RUs.

Consider the following example, where a radio access network (RAN) includes a RAN controller or other control element and a plurality of radio units (RUs) of a cell-less radio access network that are configured to engage in wireless communications with a plurality of user equipment (UEs) via at least one radio channel of the cell-less RAN. The RAN controller or other control element operates by:
  determining an initial RU/UE association that allocates the plurality of UEs among the plurality of RUs via reference signal received power (RSRP) data received from the plurality of RUs.
  receiving RU conditions data corresponding to a set of RU conditions associated with the plurality of RUs.
  receiving RU constraint data associated with the plurality of RUs.
  assigning, via at least one iterative RU sleeping loop and based on the initial RU/UE association, the RU conditions data and the RU constraint data, an active mode to a first subset of the plurality of RUs and a sleep mode to a second subset of the plurality of RUs.
  updating a dynamic RU/UE association based on the first subset of the plurality of RUs and the second subset of the plurality of RUs.

In addition or in the alternative to any of the foregoing, the RAN has an open architecture that is disaggregated and includes at least one of: a centralized unit (CU) or a distributed unit (DU).

In addition or in the alternative to any of the foregoing, the RSRP data is received from the plurality of RUs via a CU or a DU.

In addition or in the alternative to any of the foregoing, the at least one iterative RU sleeping loop dynamically determines the first subset and the second subset for each transmission time interval (TTI) of the RAN.

In addition or in the alternative to any of the foregoing, the dynamic RU/UE association is updated on a TTI basis.

In addition or in the alternative to any of the foregoing, updating the dynamic RU/UE association based on the first subset of the plurality of RUs and the second subset of the plurality of RUs includes reassigning UEs from the initial RU/UE association allocated to one of the second subset of the plurality of RUs to one of the first subset of the plurality of RUs.

In addition or in the alternative to any of the foregoing, reassigning the UEs from the initial RU/UE association allocated to one of the second subset of the plurality of RUs to one of the first subset of the plurality of RUs is based on the RSRP data.

In addition or in the alternative to any of the foregoing, the at least one iterative RU sleeping loop includes a non-conditional sleeping loop that generates network load data and assigns ones of the plurality of RUs to the first subset based on a comparison of the load data to load criteria.

In addition or in the alternative to any of the foregoing, the at least one iterative RU sleeping loop includes a non-conditional sleeping loop that assigns ones of the plurality of RUs to the first subset based on a comparison of the RSRP data to RSRP criteria.

In addition or in the alternative to any of the foregoing, the at least one iterative RU sleeping loop assigns ones of the plurality of RUs to the first subset based on a comparison of an interference contribution parameter to an average interference contribution.

In addition or in the alternative to any of the foregoing, the at least one iterative RU sleeping loop includes a non-conditional sleeping loop that assigns ones of the plurality of RUs to the first subset based on a comparison of an interference contribution parameter to an average interference contribution.

In addition or in the alternative to any of the foregoing, the at least one iterative RU sleeping loop further includes a conditional sleeping loop that assigns ones of the plurality of RUs to the second subset based on the comparison of the interference contribution parameter to the average interference contribution, only when the ones of the plurality of RUs fail to satisfy a network energy efficiency criteria.

In addition or in the alternative to any of the foregoing, the at least one iterative RU sleeping loop further includes a conditional sleeping loop that assigns ones of the plurality of RUs to the second subset based on the comparison of an interference contribution parameter to an average interference contribution, only when the ones of the plurality of RUs fail to satisfy a minimum energy efficiency criteria.

In addition or in the alternative to any of the foregoing, the at least one iterative RU sleeping loop further includes a conditional sleeping loop that computes a network throughput and proceeds to a next iteration based on the network throughput and a baseline throughput.

In addition or in the alternative to any of the foregoing, the method is implemented via the RAN controller that includes a network interface, a memory that stores operational instructions corresponding to a sleep mode control application and a processor that executes the operational instructions to perform the steps of the method.

Further details regarding the operation of the sleep mode control application including several optional functions and alternative features, are included in the discussion that follows.

In the following, let us consider a set of RUs $\mathcal{M} = \{1, \ldots, M\}$ and a set of UEs $\mathcal{K} = \{1, \ldots, K\}$, where M and K are the total number of RUs and UEs in the network accordingly. The antennas of the RUs are considered omni-directional. The set of users under a particular RU $m \in \mathcal{M}$ coverage is denoted by $U_m$. Channel gain between user $k \in K$ and RU m is $h_{m,k}$ including pathloss and shadowing effects. $P^m$ is the transmission power of RU m and $\sigma$ is the additive white Gaussian noise power at each receiver. The signal-to-interference-plus-noise ratio (SINR) for the k-th user served by RU m in the downlink (RU to UE) is denoted by $\gamma_{m,k}$. Considering $\mu_m$ as the sleep mode indicator, which is representing RU in sleep mode if $\mu_m=1$, and in active mode if $\mu_m=0$, the SINR in the downlink $\gamma_{m,k}$ can be written as $$\gamma_{m,k} = \frac{(1-\mu_m)P^m|h_{m,k}|^2}{\sum_{j \neq m, j \in M}(1-\mu_j)P^j|h_{j,k}|^2 + \sigma^2}. \quad (1)$$

Aggregating the throughput per resource block (RB) of the set of users that are served by RU m, that is the set $U_m$, denoted by $R_{m,i_{RB}}$, the total throughput of the particular RU m can be obtained as $$R_m = \sum_{i \in U_m} N_i R_{m,i_{RB}}$$

where $N_i$ is the minimum required number of RBs for a particular user.

According to the EARTH power model, the total consumed power $P_{Total}^m$ is the summation of circuit power and transmit power (i.e., $P_{Total}^m = P_{cir}^m + \alpha P_{out}^m$) while the transmit power $P_{out}$ would be limited to the maximum power at full load. $\alpha$, $P_{out}$, $\rho_m$, and $N_T$ represent the power amplifier efficiency, transmission power, load for a particular RU m, and the total number of RBs. The transmitted power can be written as $$P_{out}^m = \rho_m P_{max}^m \quad (3)$$

$$\rho_m = \frac{\sum_{i \in U_m} N_i}{N_T}. \quad (4)$$

As the major source of power consumption is the circuit power of an active RU, through switching a RU to the sleep mode with zero transmission power, much lower circuit power could be consumed. The circuit power can be measured as $$P_{cir} = (1-\mu)P_{cir}^{active} + \mu P_{cir}^{sleep} \quad (5)$$

while one or more embodiments considers $P_{cir}^{active}$ and $P_{cir}^{sleep}$ as circuit power for active and sleep RU respectively. The total network EE can be calculated as the aggregation of the RUs throughput divided by the total network power consumption, namely $$EE_{Total} = \frac{\sum_{m \in M} R_m}{\sum_{m \in M} P_{Total}^m}. \quad (6)$$

III. Problem Formulation and Examples of a Proposed Energy-Efficiency Enhancement (3×E) Scheme A. Problem Formulation Let A, which is a matrix of size K×M, represents the status of the users' connection to RUs. If $\mu_m=0$ and the user k is connected to RU m, set A(k,m)=1, otherwise A(k,m)=0. In order to find the efficient dynamic user association to the cell-less RAN and deciding to switch inefficient RUs in sleep mode that maximize the network EE, the optimization problem can be expressed as $$A^* = \arg_A(\text{Max}(EE_{Total})) \quad (7)$$

Subject to:

$$A^* = \arg_A(\text{Max}(EE_{Total})) \quad (7)$$

Subject to:

$C1: A(k,m) \in \{0,1\}, \forall k=1,\ldots,K, \forall m=1,\ldots,M$ $C2: \sum_{j \in M} R_j \geq \left((1-\beta) \sum_{j \in M} R_j^{baseline}\right)$ $C3: \sum_{k=1}^{K} A(k,m) \leq N_T, \forall m=1,\ldots,M$ $C4: \sum_{m=1}^{M} A(k,m) \leq 1, \forall m=1,\ldots,K$ $C5: R_k = N_k R_{m,k_{RB}} > R_{k_{min}}, \forall m=1,\ldots,K$ $C6: \min\left(EE_j = \frac{R_j}{P_{Total}^j}\right) \geq \min(EE_m), \forall j \in M_{active}^{temp}, \forall m \in M_{active}$ $C7: P_{out}^m \leq P_{max}^m, \forall m=1,\ldots,M$ The constraint C1 represents the binary value matrix A. Constraint C2 is ensuring that the network throughput does not suffer a big loss (considering $R_j^{baseline}$ as the total throughput of a particular RU j before applying example sleep mode techniques on the system and $\beta$ as the allowed traffic loss ratio which is configurable based on network conditions and operator preferences). According to constraints C3 and C4, each RU can use up to a maximum number of available RBs and each UE may be served by maximum one RU, respectively. Constraint C5 ensures that the required throughput of each UE is achieved, where $R_{k_{min}}$ denotes the minimum required throughput for user k. Constraint C6 (assuming $M_{active}^{temp}$ as the temporary RU active set where $M_{active}^{temp} = M_{active} \cup \{RU\ j\}$ to include RU j temporary) ensures that the number of transmissions per energy unit will be increased along with saving the power consumption. Finally, the constraint C7 will keep the transmission power limited to a maximum transmission power of any particular antenna.

The aim is to enhance the EE through the choice of the active and sleep sets of RUs including UE-RU association. The optimal solution could be found through an exhaustive search, which is not time and computationally efficient. Hence, one or more embodiments proposes a scheme which enhances the EE ending up with a near optimal solution. In this work, the customized RU sleep mode selection solution will consider the interference that each RU is causing to the network in comparison to its provided useful signal. Therefore, the interference ratio parameter in the downlink can be defined as follows which is adapted from the interference contribution ratio (ICR) concept $$\lambda_m = \frac{\sum_{i \notin U_m} P^m |h_{m,i}|^2}{\sum_{i \in U_m} P^m |h_{m,i}|^2}. \quad (8)$$

This approach could consider the following inputs in order to improve network EE performance. These includes priority policy configuration (e.g., scheduler selection, KPI objective, decision making priority), scheduling status, UEs' QoS, Carrier/Radio characteristics, EE/EC measurement reports, load statistics per coverage area and per carrier, UE mobility information including coverage area or beam level measurements (e.g., RSRP, RSRQ, SINR), power consumption measurements, and geolocation information.

The higher ICR a particular RU has, the lower useful signal it provides toward the network. However, the higher ICR will reflect propagating more interference to the network. Therefore, the RU will cause the entire network transmission performance to be degraded. In this case, such active RU will be considered as energy wasting and the cell-less network could gain more by saving power consumption through making it sleep. Therefore, users' radio conditions improve thanks to interference mitigation.

B. Examples of a (3×E) Scheme

Various examples include an energy-efficient UE-RU association with the possibility of making inefficient RUs sleep. These examples can contain two phases: (i) initial UE-RU association, (ii) RU sleep mode selection. Using the RU sleep mode selection considering load, reference signal received power (RSRP)[1] of serving UEs and interference, could reduce the power consumption and enhance throughput.

[1] The RSRP can be defined as "linear average over the power contributions (in Watts) of the resource elements that carry cell-specific reference signals within the considered measurement frequency bandwidth".

Initial UE-RU association: In the first step, the initial association will be executed with the link providing the highest RSRP $P_r(k,m)$ for each user k from a particular RU m in the network. In the cell-less network, this information can be obtained at the central RAN controller thanks to the information that UEs periodically feedback. The pseudocode of user association is given in Algorithm 1.

RU sleep mode selection: The sleep mode control application will execute the (3×E) scheme in a cooperative manner (i.e., considering a set of RU's conditions and constraints) thanks to the central RAN controller support.

Figure 2:
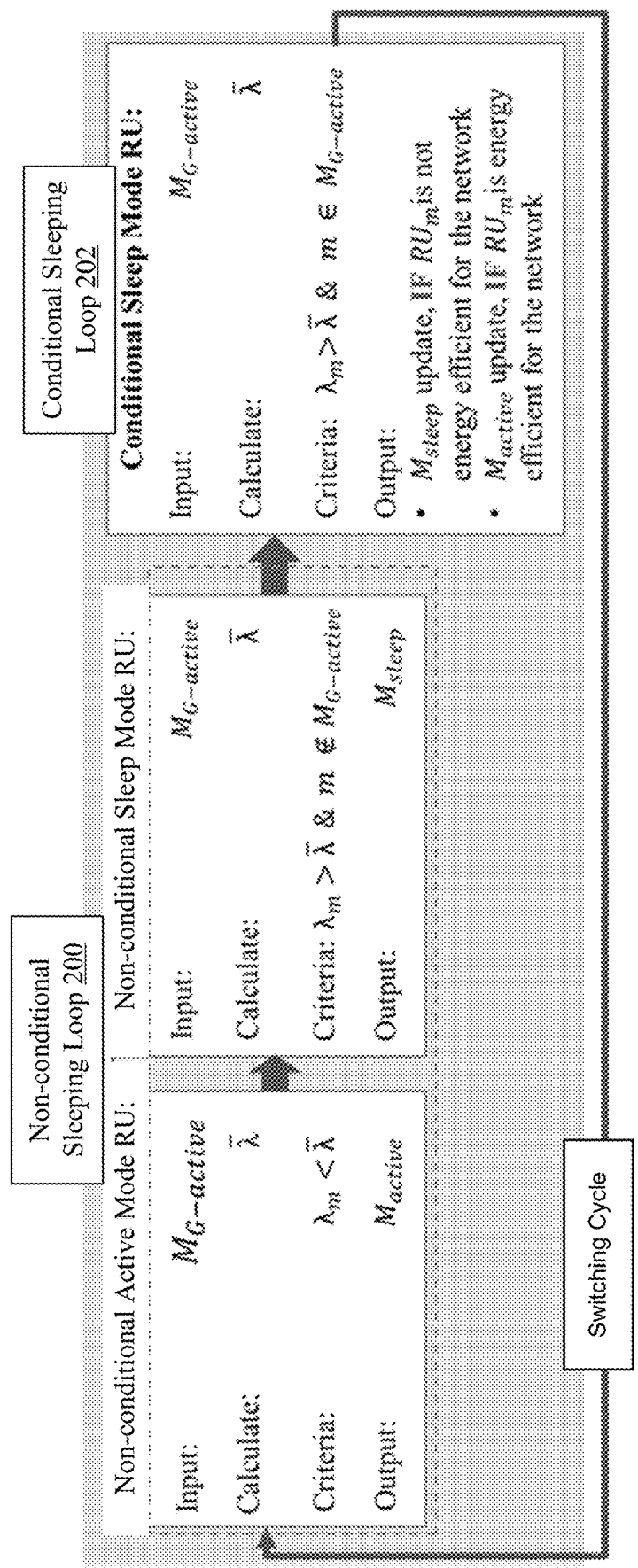
FIG. 2 is a flow diagram illustrating an example of a high-level energy efficiency technique.

The proposed (3×E) RU sleep mode selection scheme would dynamically update the association and sleep RUs set considering the latest network states; this result could be used within any particular scheduling time. In this work each cycle is performed under two separate loops, denoted as a non-conditional and conditional RU sleeping loop for whatever scheduler is employed. The high-level view of an example (3×E) scheme is portrayed in FIG. 2.

---

Algorithm 1: The initial UE-RU association phase of sleep mode proposed technique

---

Input : $A = |0|_{K \times M}$; K; M; $P_r$
Output: A
1. for i = 1: K do
2. | $m^* = \arg_A \max(P_r(i,m))$
3. | $A(i,m^*) = 1$
4. end for
5. return A

---

Let us define $M_{G\text{-}active}$ as the set of RUs satisfying $$\max(RSRP_j) > RSRP_{thr} \text{ or } \rho_j > \rho_{th} \quad (9)$$

Where, $$\max(RSRP_j) = \max(P^j |h_{j,i}|^2), i \in U_j.$$

$RSRP_{thr} = 5 \min (RSRP_j)$ and $\rho_{th} = 0.5 \ N_T$ represent network RSRP and load thresholds, respectively. The set $M_{G\text{-}active}$ satisfies $$\|M_{G\text{-}active}\|_0 = L$$

Where, ($\|.\|_0$ indicates the set cardinality). Given $M_{G\text{-}active}$, average ICR parameter $\bar{\lambda}$ can be obtained as $$\bar{\lambda} = \frac{\sum_{j \in M_{G\text{-}active}} \lambda_j}{L}. \quad (10)$$

In the first stage, the non-conditional RU sleeping loop 200 determines the non-conditional active mode RU and non-conditional sleep mode RU sets, that is, the RUs that will surely be either active or put to sleep, respectively.

Non-conditional Active Mode RU: $M_{active}$ set formed by each particular RU m satisfying $$\lambda_m < \bar{\lambda}, \ m \in M \quad (11)$$

Non-conditional Sleep Mode RU: $M_{sleep}$ set formed by each particular RU $m \notin M_{G\text{-}active}$ satisfying $$\lambda_m > \bar{\lambda} \quad (12)$$

Now, in a second stage referred to as conditional sleeping loop 202, some RUs will be conditionally considered to be either active or asleep, as follows.

Conditional Sleep Mode RU: In this loop, each particular RU $j \in M_{G\text{-}active}$, will be included in $M_{active}^{temp}$ set temporary if it satisfies $$\lambda_j > \bar{\lambda}. \quad (13)$$

Each $RU \in M_{active}^{temp}$ would be included in $M_{active}$ set permanently if satisfying (14) and (15) conditions. Otherwise, it would be included in $M_{sleep}$ set permanently.

$$\min(EE_j) > \min(EE_m), \ j \in M_{active}^{temp}, \ m \in M_{active}. \quad (14)$$

$$\frac{\sum_j R_j}{\sum_j P_{Total}^j} > \frac{\sum_m R_m}{\sum_m P_{Total}^m}, \ j \in M_{active}^{temp}, \ m \in M_{active}. \quad (15)$$

---

Algorithm 2: Propsosed (3 × E) RU sleep mode selection scheme

---

Input : A; $R_{k_{num}}$; k ∈ K; $N_T$; $RSBP_j$; $\rho_j$; j ∈ M; $RSRP_{thr}$; $\rho_{th}$; $M_{G\text{-}active} = [\ ]$; $M_{active} = [\ ]$; $M_{sleep} = [\ ]$; β
Output: $M_{sleep}$; $M_{active}$; Updated A
1 Obtain Network baseline throughput $R_{Total}^{baseline} =$ -continued Algorithm 2: Propsosed (3 × E) RU sleep mode selection scheme $\Sigma_{j \in M} R_j^{baseline}$ by (2)
2  Calculate $EE_{Total}$ by (6) using (2)
3  for each RU j ∈ M set do
4  |  If RU j satisfies (9) then
5  |  |  $M_{G\text{-}active}$ ← RU j
6  |  end if
7  end for
8  Calculate $\bar{X}$ by (10) given $M_{G\text{-}active}$
9  for each RU j ∈ M set do
10 |  if RU j satisfies (11) then
11 |  |  $M_{active}$ ← RU j
12 |  end if
13 end for
14 for each RU j ∉ $M_{G\text{-}active}$ do
15 |  if RU j satisfies (12) then
16 |  |  $M_{sleep}$ ← RU j
17 |  end if
18 end for
19 Find set of UEs not assigned to any RU j ∈ $M_{active}$ as un-defined UE set $K_{UD}$
20 for each UE i ∈ $K_{UD}$ and RU j ∈ $M_{active}$ do
21 |  Repeat Algorithm 1
22 |  Update A
23 end for
24 for each RU j ∈ $M_{G\text{-}active}$ do
25 |  if RU j satisfies (13) then
26 |  |  if RU j satisfies (14) and (15) then
27 |  |  |  $M_{active}$ ← RU j
28 |  |  else
29 |  |  |  $M_{sleep}$ ← RU j
30 |  |  end if
31 |  end if
32 end for
33 Update $K_{UD}$
34 Go to (Repeat step 19:23)
35 Calculate Network throughput $R_{Total} = \Sigma f \in M_{active} R_j$ by (2)
36 If $R_{Total} \geq (1-\beta) \times R_{Total}^{baseline}$ then
37 |  Go to next switching cycle (Repeat step 2:35)
38 end if This process updates the UE-RU association and the RU sets dynamically and based on the latest status of the RUs to reach a near optimal and network energy-efficient association. The example of priority of executing UE to RU re-associations may be taken from the recommendation of (3×E) Scheme. However, the radio network could be configured in a way to let the scheduler make the final decision considering the priority policies (e.g., ongoing emergency alarms, perform some preparation actions for switching, etc.) with the alignment of network target objective functions (e.g., Capacity, Energy Efficiency, etc.). A sleeping RU may be activated again in different radio situations such as following (but not limited to):

a. If the demand of UEs cannot be served by active RUs, then sleep RU may be turned active.
b. The scheduler can make this decision about particular RU to be active and serve demanding UE.
c. Alternatively, the 3×E scheme can switch the nearest sleep RU into active mode (that may provide the strongest RSRP) to the demanding UE.

The interface between 3×E and scheduler can be based on several criteria, e.g., consensus building, conflict mitigation, etc. It is noted that point a. is an example identification for switching a sleep RU to active mode, while point b. and point c. are examples of identifying a particular sleep RU to be activated.

Figure 3:
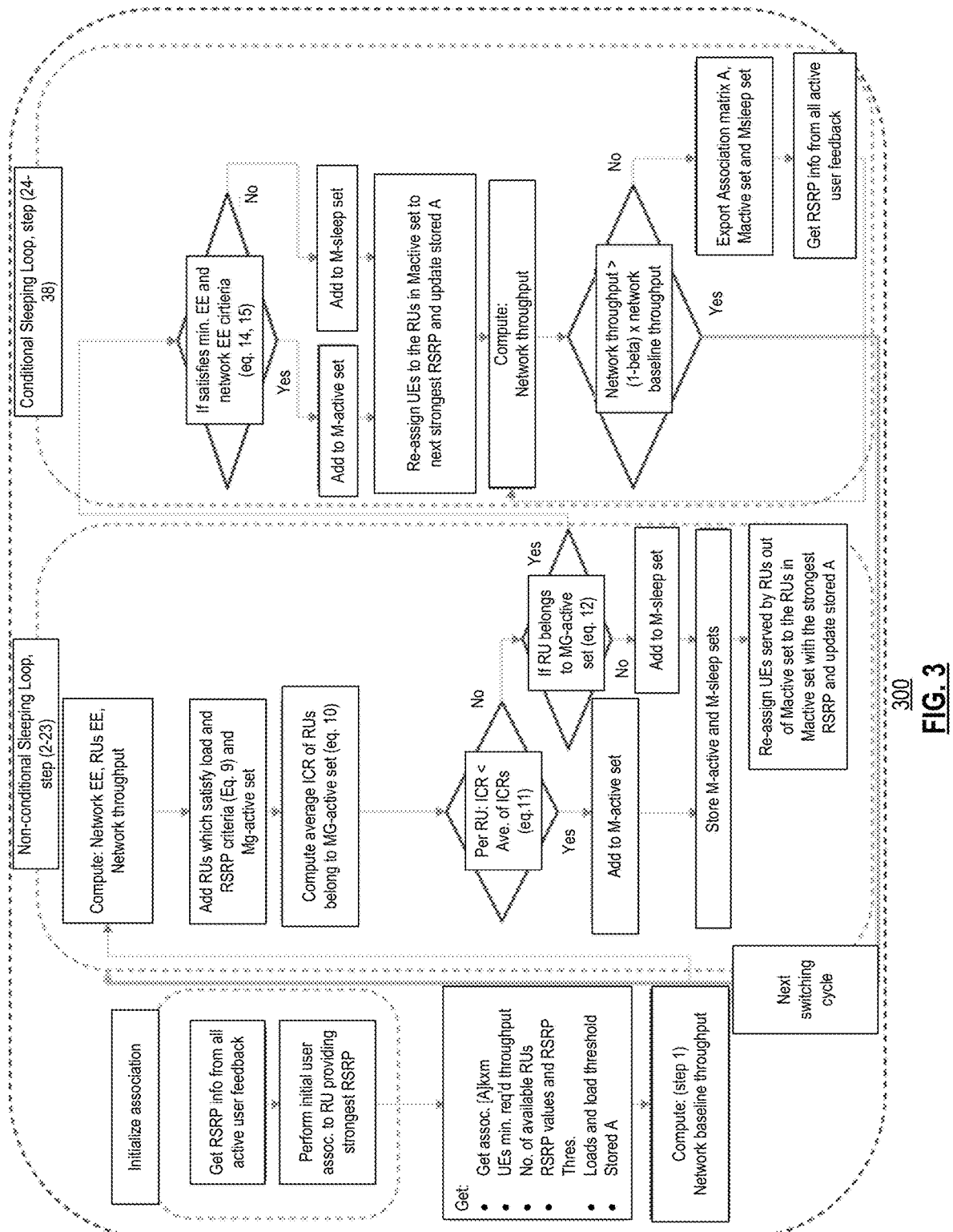
FIG. 3 is a flow diagram illustrating an example of an energy efficient technique.

Algorithm 2 shows the details of the proposed (3×E) RU sleep mode selection scheme. Separating the loops in order to have a conditional interference management, apart from a non-conditional sleeping loop, would give the higher level of enhancement of network EE in the lower populated interfering scenarios. The conditional sleeping loop enhances the power saving and increases the transmission rate per energy unit. These efficient steps to enhance the EE (i.e., activation/deactivation process to separate loops and conditional interference management) are beyond the available works. While satisfying constraint C2, the proposed (3×E) RU sleep mode selection scheme is performed continuously (each iteration is denoted as switching cycle) along time in the cell-less network. This process updates the UE-RU association and the RU sets dynamically and based on the latest status of the RUs to reach a near optimal and network energy-efficient association. The flow diagram of an example algorithm is illustrated in the diagram 300 of FIG. 3.

IV. Performance Evaluation and Result Analysis

A. Simulation Scenarios and Parameters

In simulation setup of a cell-less architecture, one or more embodiments assumes a hexagonal network topology with 150 m inter site distance (ISD), with 20 MHz bandwidth over a carrier frequency of 4 GHz. RU height is 3 m and UE height is 1.5 m. The RU and UE antenna gains are assumed to be 5 dB and 0 dB respectively. The required UE throughput is considered as 1 Mbps for all users. The UEs are randomly deployed over the entire network. One or more embodiments consider various power consumption parameters to calculate EE. The maximum transmit power for RU m is set as 0.13 W, with setting 6.8 W and 4.3 W for the circuit power in active and sleep mode respectively.

$$PL_{InH\text{-}NLos} = 16.9 \log_{10}(d_{3D}) + 32.8 + 20 \log_{10}(f_c) \quad (16)$$

$$PL_{InH\text{-}NLos} = 43.3 \log_{10}(d_{3D}) + 11.5 + 20 \log_{10}(f_c) \quad (17)$$

where $d_{3D}$ is the distance between the transmitter and receiver in meters and $f_c$ is carrier frequency in GHz. Other related configurations are aligned with the system-level simulation parameters.

A. Simulation Results and Analysis

In this section, one or more embodiments evaluates the following schemes and compare their performances:
   Baseline Algorithm: This performs the best cell (strongest link) UE-RU association without any sleep mode scheme.
   EE Algorithm—Deterministic (3×E) scheme: This sleeping scheme performs as described in III-B, while it will not check the conditions (14) and (15). The candidate RUs of the conditional loop entirely would be included in $M_{sleep}$ set. The switching cycle is executed only once per TTI.
   EE Algorithm—Conditional (3×E) scheme: This is the scheme as described in III-B with a switching cycle executed only once per TTI.
   EE Algorithm—Proposed (3×E) scheme: This is the proposed scheme as described in III-B. The algorithm switching cycle will be continued while satisfying C2 from (7), where β=4%.

Figure 4:
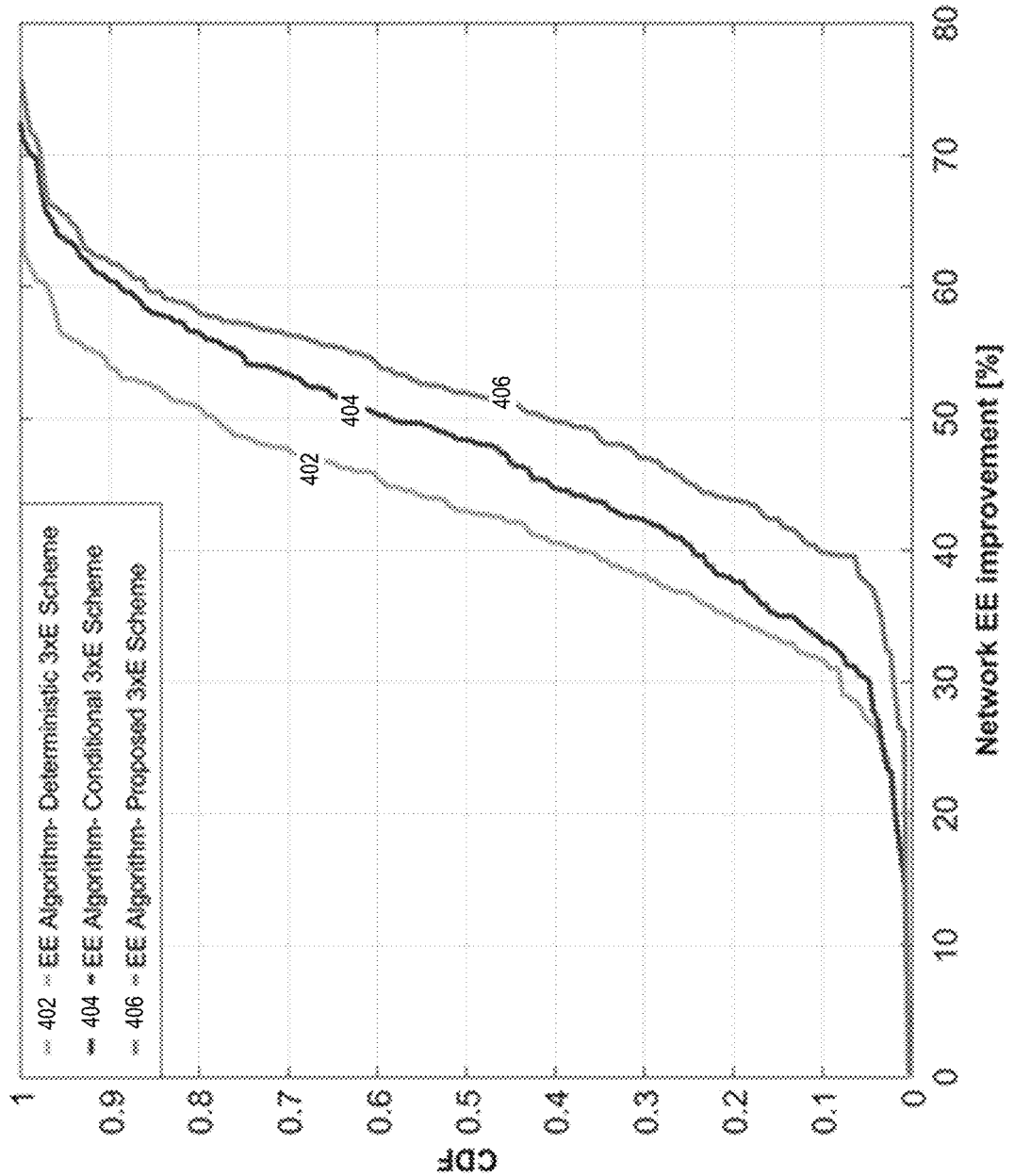
FIG. 4 is a graphical diagram illustrating an example of comparison of EE methodologies.
Figure 5:
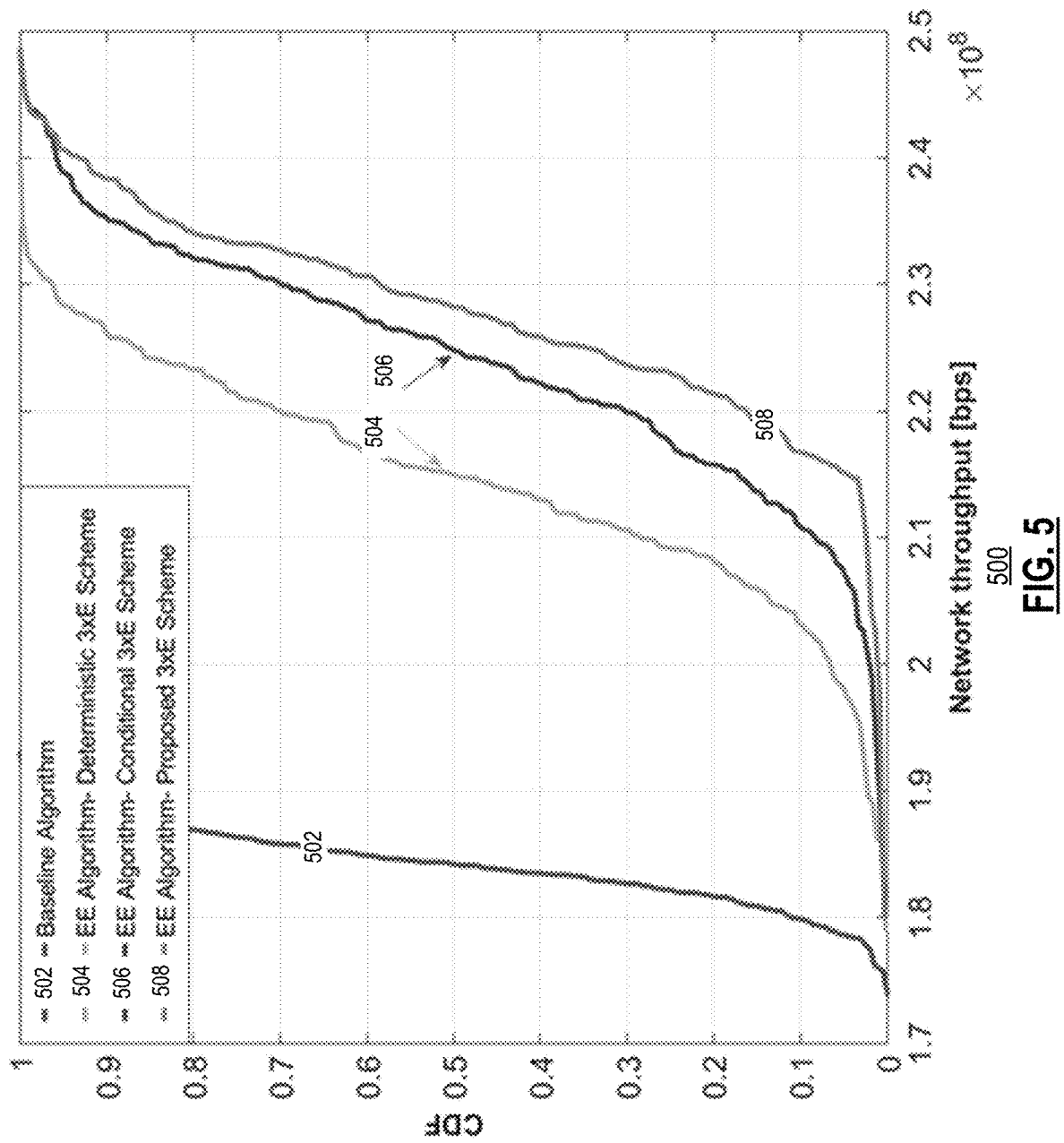
FIG. 5 is a graphical diagram illustrating an example of comparison of EE methodologies.
Figure 6:
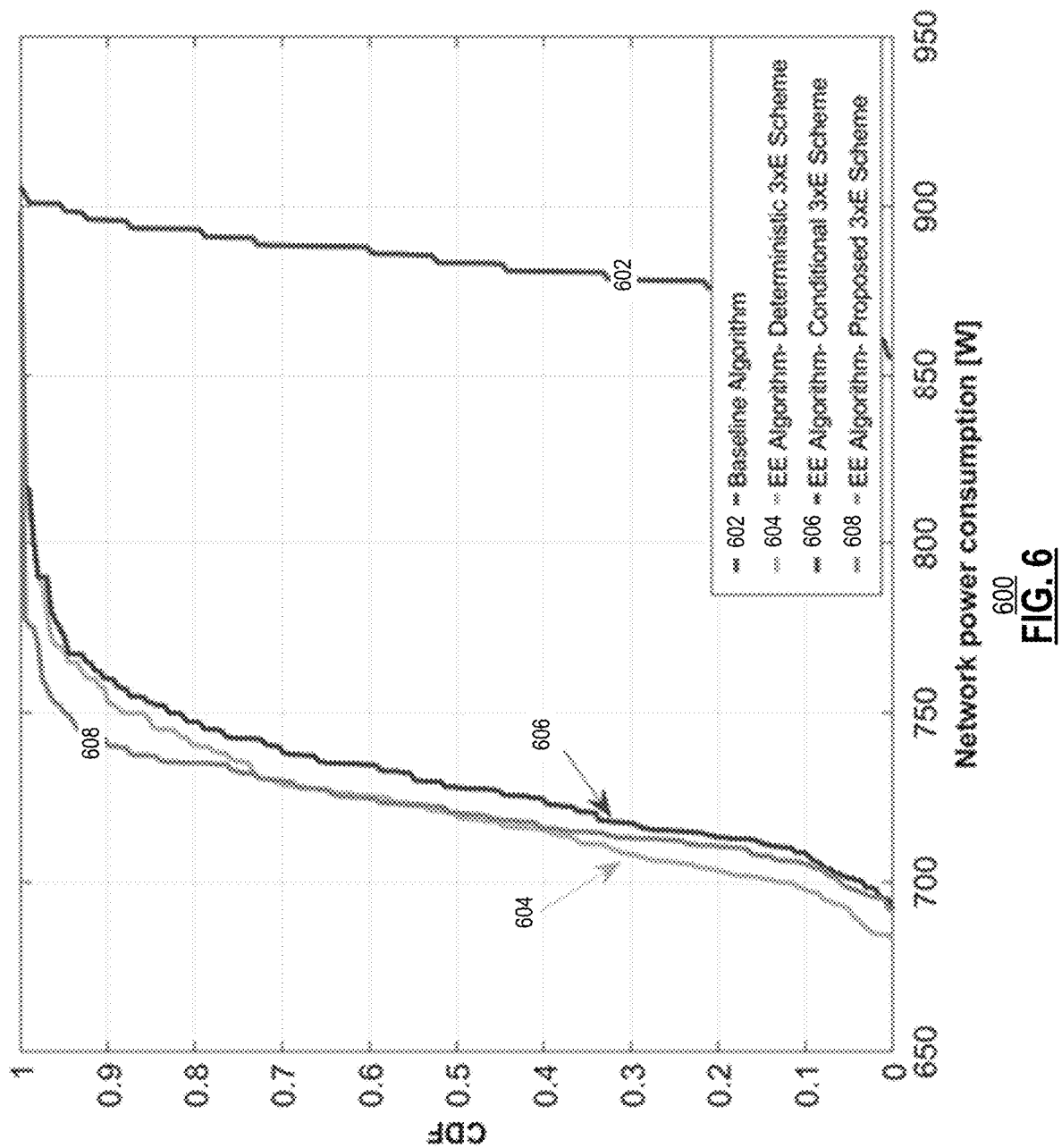
FIG. 6 is a graphical diagram illustrating an example of comparison of EE methodologies.

The conditional RU sleeping loop benefit is illustrated in graph 400 of FIG. 4 with hexagonal RU deployment that shows the cumulative distribution function (CDF) of network EE enhancement of different options for 150 RUs and 150 UEs. FIG. 4 shows the benefit of conditional interference management in interfering scenarios with lower population of UEs. In such scenarios, low loaded RUs with high $\lambda_m$ (interference contribution ratio) will be prevented from being active through a non-conditional loop. However, highly loaded RUs with high $\lambda_m$ that are not energy efficient will also be made sleep through the conditional loop. In this case, due to the lower user densification, a lower number of RUs with low load will have high $\lambda_m$ in order to enter the non-conditional loop. Therefore, the conditional loop will make the remaining higher loaded RUs sleep depending on their impact on the network and individual EE performance. The graph 500 of FIG. 5 shows that the conditional and proposed (3×E) schemes provide a higher amount of transmitted bits and network throughput compared to the deterministic scheme. As it is shown in graph 600 of FIG. 6, the deterministic scheme has lower power consumption due to placing more RUs in sleep mode as compared to the conditional scheme. However, some of the slept RUs may have been efficient in terms of transmitted bits per energy unit. Therefore, reconsidering RUs from the $M_{G\text{-}active}$ set for sleep mode through a conditional scheme will assure an EE gain as compared to the deterministic scheme in low loaded scenarios, as shown in FIG. 4.

Figure 7:
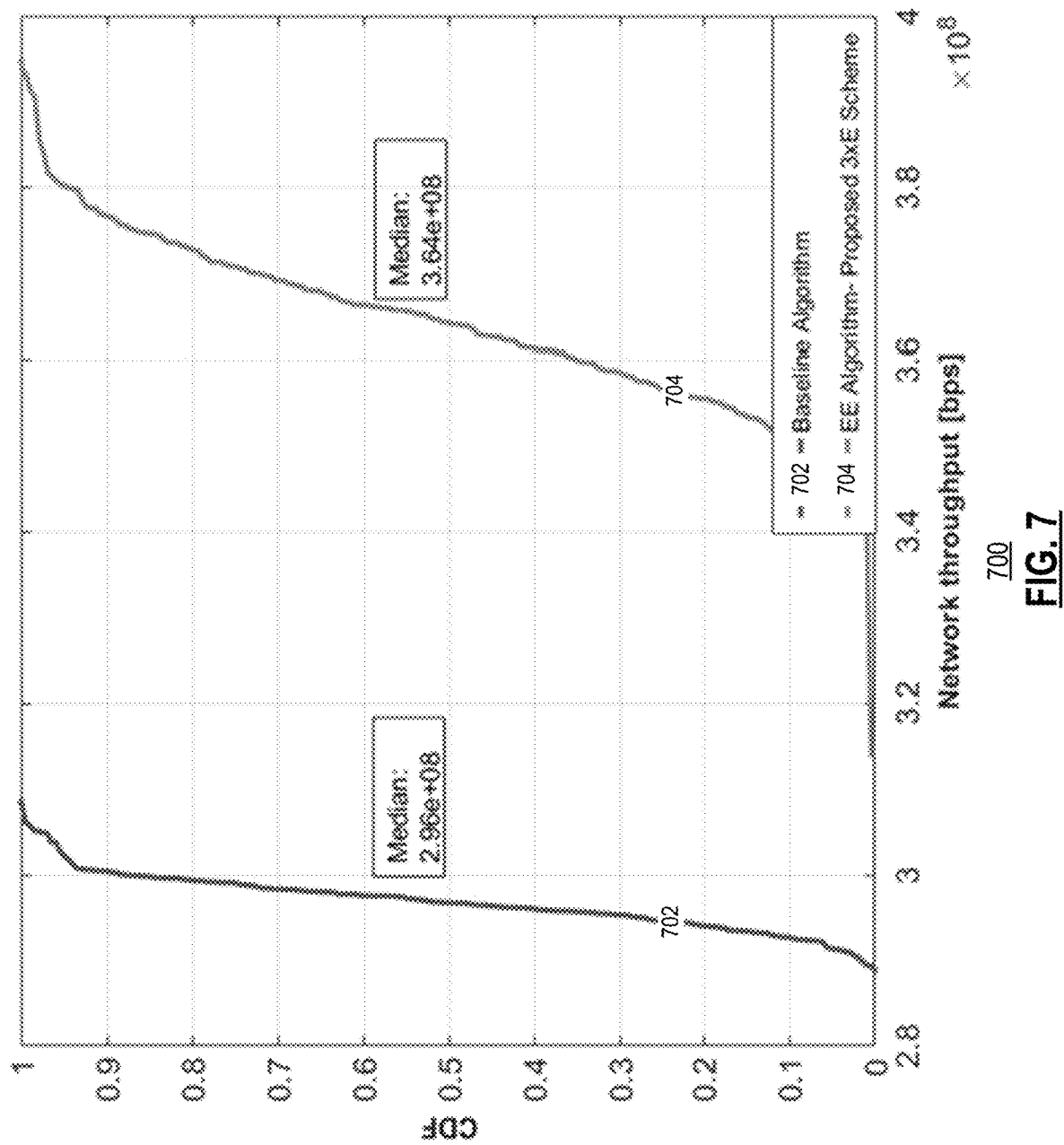
FIG. 7 is a graphical diagram illustrating an example of comparison of EE methodologies.
Figure 8:
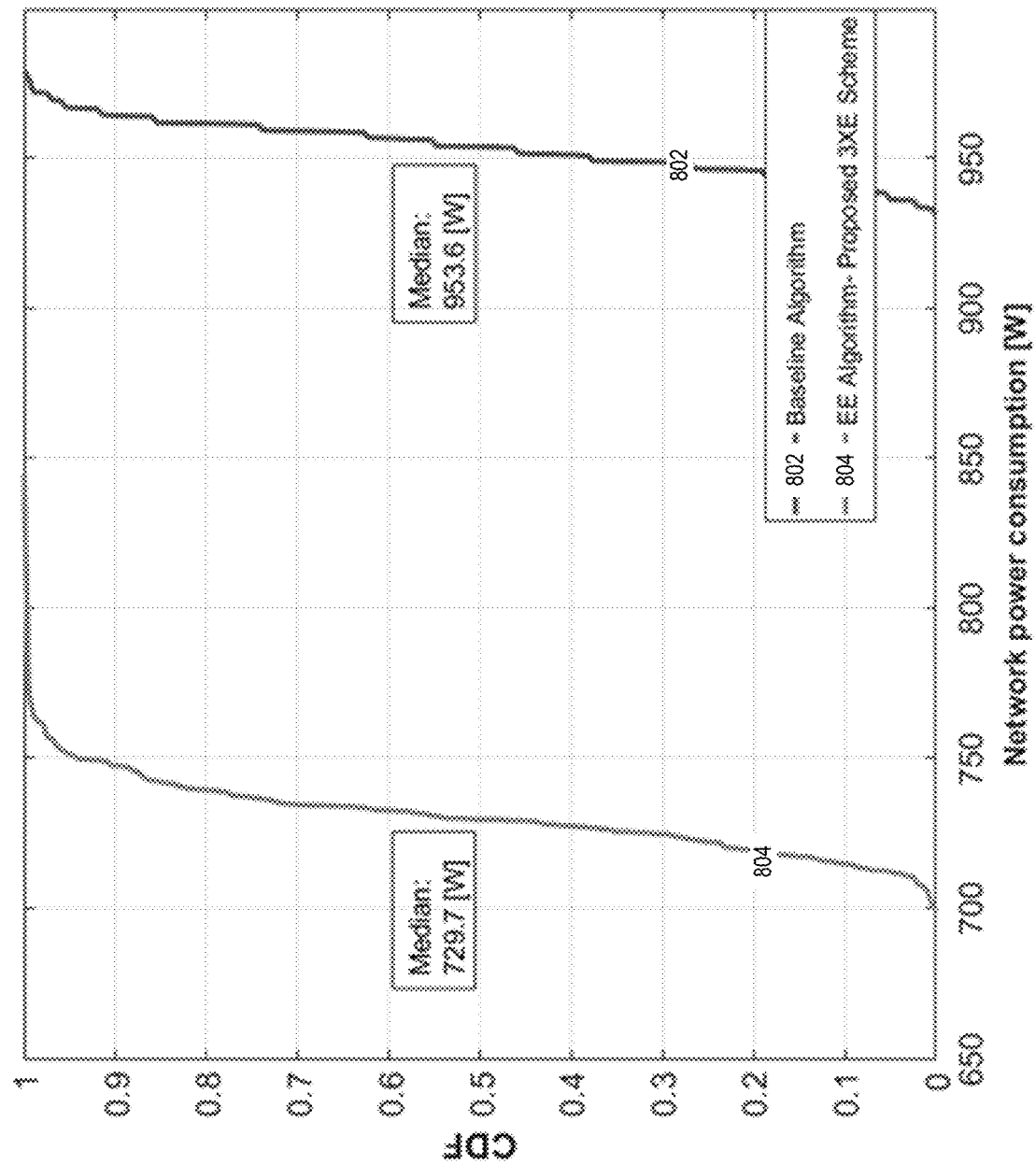
FIG. 8 is a graphical diagram illustrating an example of comparison of EE methodologies.
Figure 9:
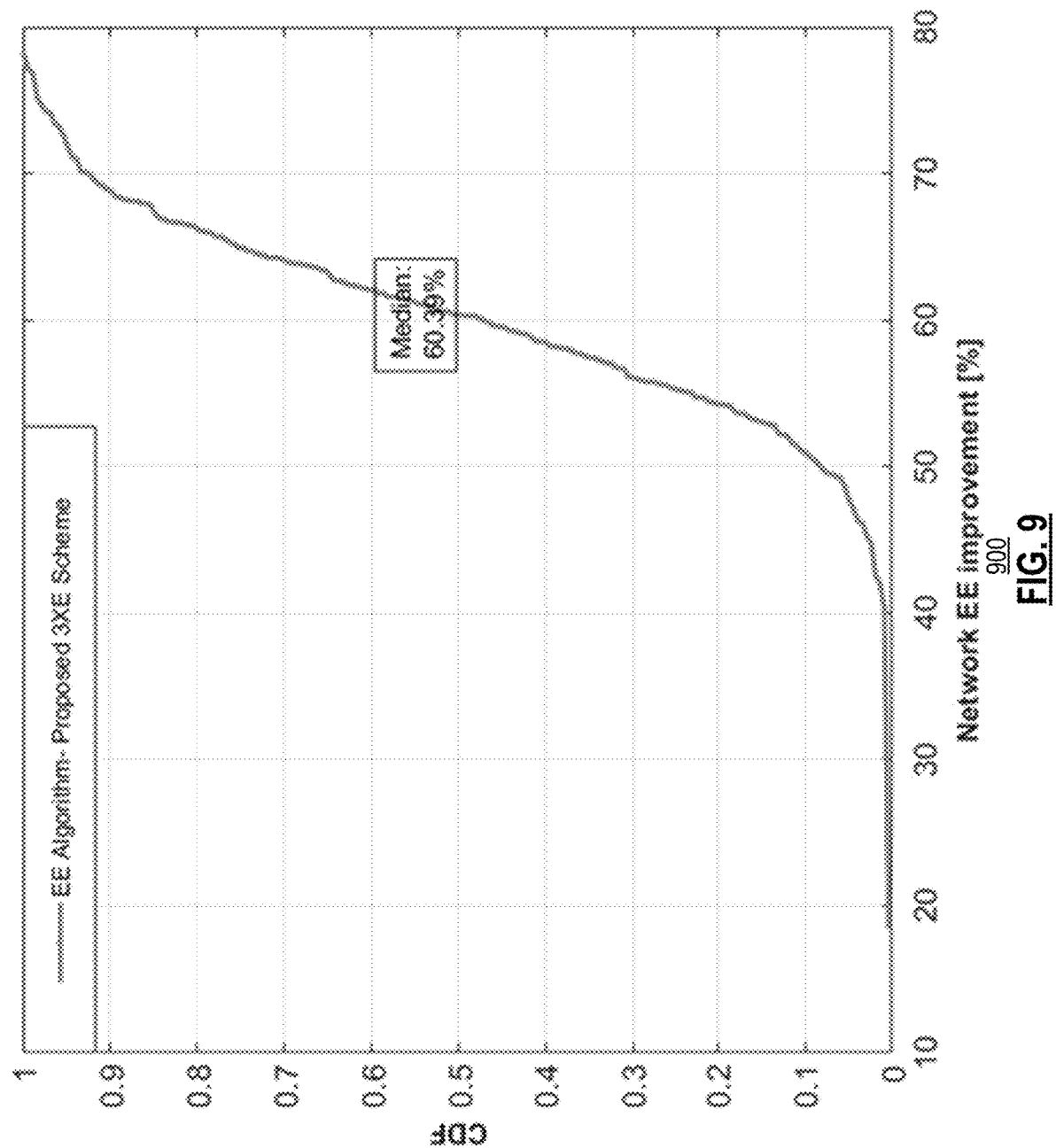
FIG. 9 is a graphical diagram illustrating an example of comparison of EE methodologies.

The remaining simulations are performed for 150 RUs and 250 UEs to analyze more general scenarios reflecting dense networks. The graph 700 of FIG. 7 presents the simulation results for network throughput. The proposed (3×E) algorithm outperforms the baseline algorithm within the dense cell-less network. The interference management considerations within proposed loops and traffic loss control support the network throughput enhancement, compared with the conventional scheme. The total power consumed by all the RUs is shown in graph 800 of FIG. 8. Considering the applied proposed non-conditional sleep loop to make inefficient RUs sleep, in addition to strict control over the RUs in terms of energy efficiency which do not violate all the criteria will not let any power wasting RU stay active through the conditional loop. This is the reason why the proposed scheme shows the lowest consumed power compared with the other algorithms. The CDF of the network EE improvement is shown in graph 900 of FIG. 9. It is observed that the expected performance enhancement was satisfied thanks to the network throughput improvement and saving the power consumption through non-conditional and condition sleeping RU loops.

Figure 10:
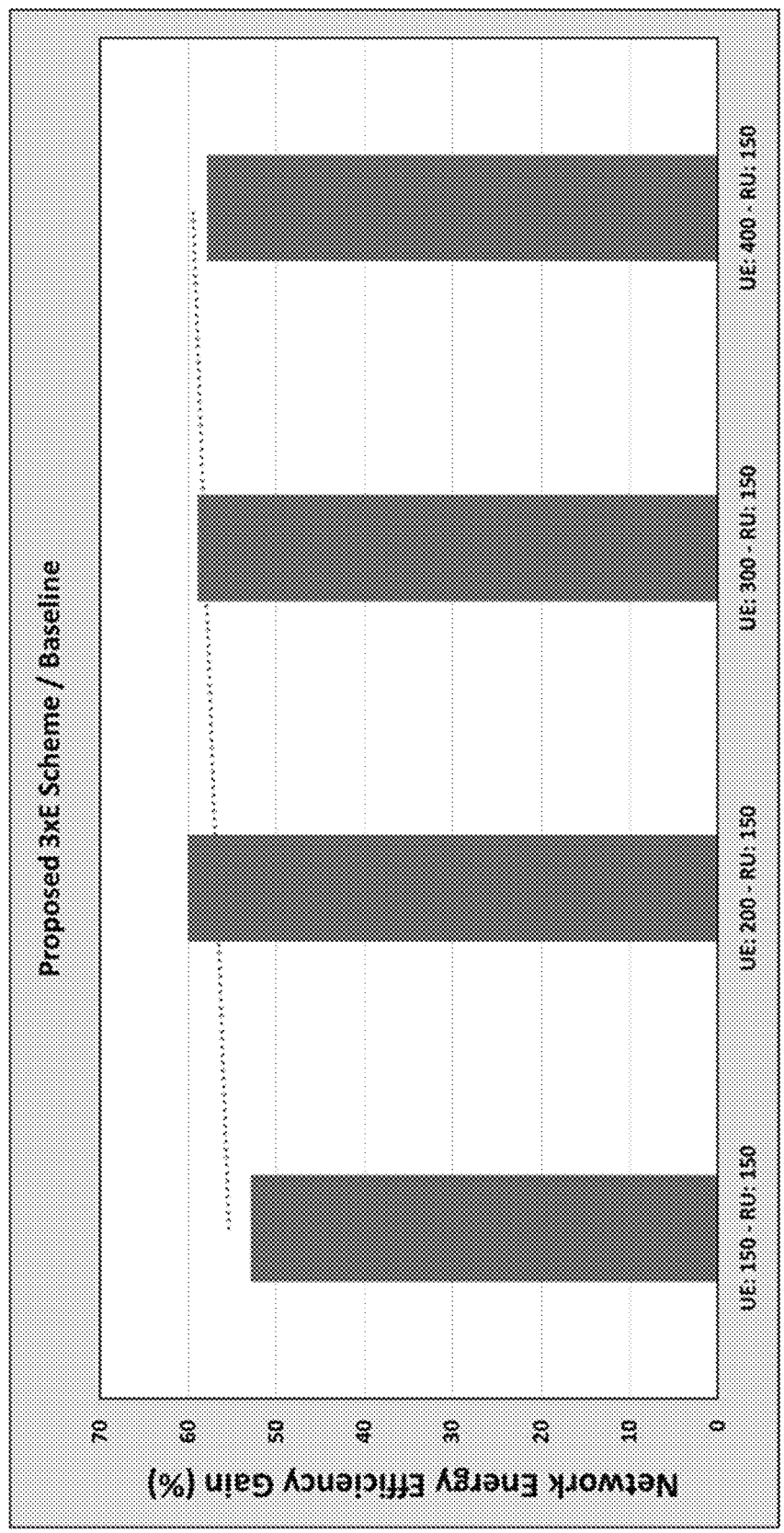
FIG. 10 is a graphical diagram illustrating an example of comparison of EE methodologies.

To analyze the sensitivity of examples of the proposed scheme to UE densification, one or more embodiments simulates the schemes with an increased number of UEs and a fixed number of 150 RUs. The obtained network EE gain of the proposed (3×E) RU sleep mode selection over the baseline algorithm are plotted in graph 1000 of FIG. 10. The UE densification increment will increase the load of the RUs and reduce the interference ratio per RU. The number of RUs meeting the criterion to enter the sleep mode will be decreased due to the high load in the RUs. Hence, the power saving will be smaller. On the other hand, having a lower interference contribution ratio will cause lower interference in the network and, therefore, higher throughput will be achieved. In high user-densification scales, examples of the proposed scheme will gain in EE performance thanks to the non-conditional loop criteria based on the interference contribution of low loaded RUs. This is in addition to making highly loaded and non-energy efficient RUs sleep through a conditional loop. Therefore, the proposed (3×E) scheme has a stable performance gain with respect to the conventional algorithm, within the more populated area. It shows that examples of the proposed scheme manage interference in the network even in the densely populated scenarios, while the conditional sleeping RU loop will take care of the performance dependency on the densification intensity. Thus, it avoids the performance degradation in low-loaded environments. The stability of the performance of the proposed (3×E) to the user densification is shown in FIG. 10.

Figure 11:
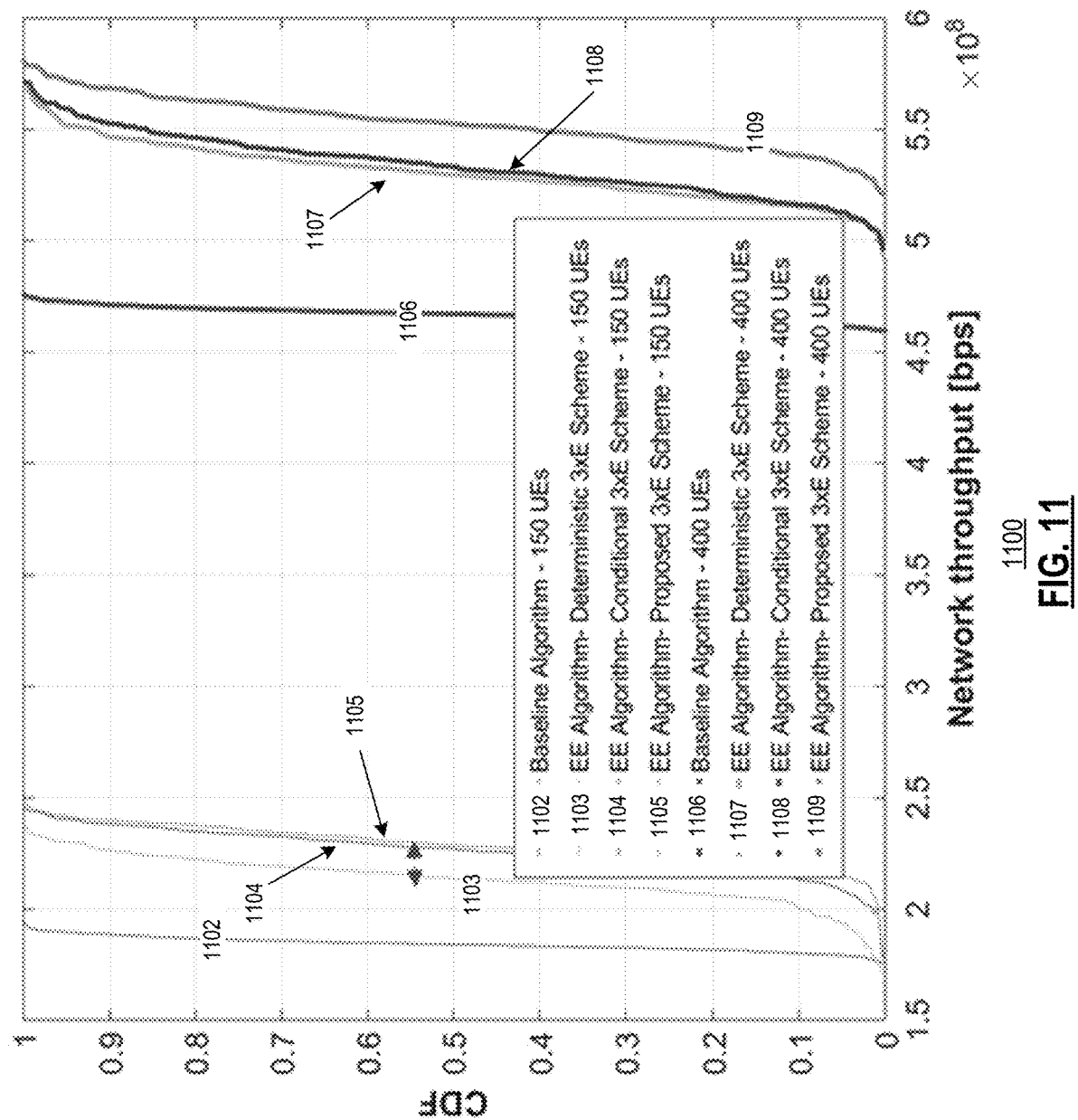
FIG. 11 is a graphical diagram illustrating an example of comparison of EE methodologies.

FIG. 11 presents a graph 1100 that shows how the conditional loop avoids a throughput degradation in a low-load network as compared to the deterministic (3×E) scheme. In contrast, in a highly densified scale, such as 400 UEs in the simulation setup, the conditional loop does not add any advantage, while the performance is maintained. Thanks to these facts, the network will keep running energy efficiently for different scales in a very stable manner. These attributes prove the stability of various embodiments of the proposed approach regarding EE.

Figure 12:
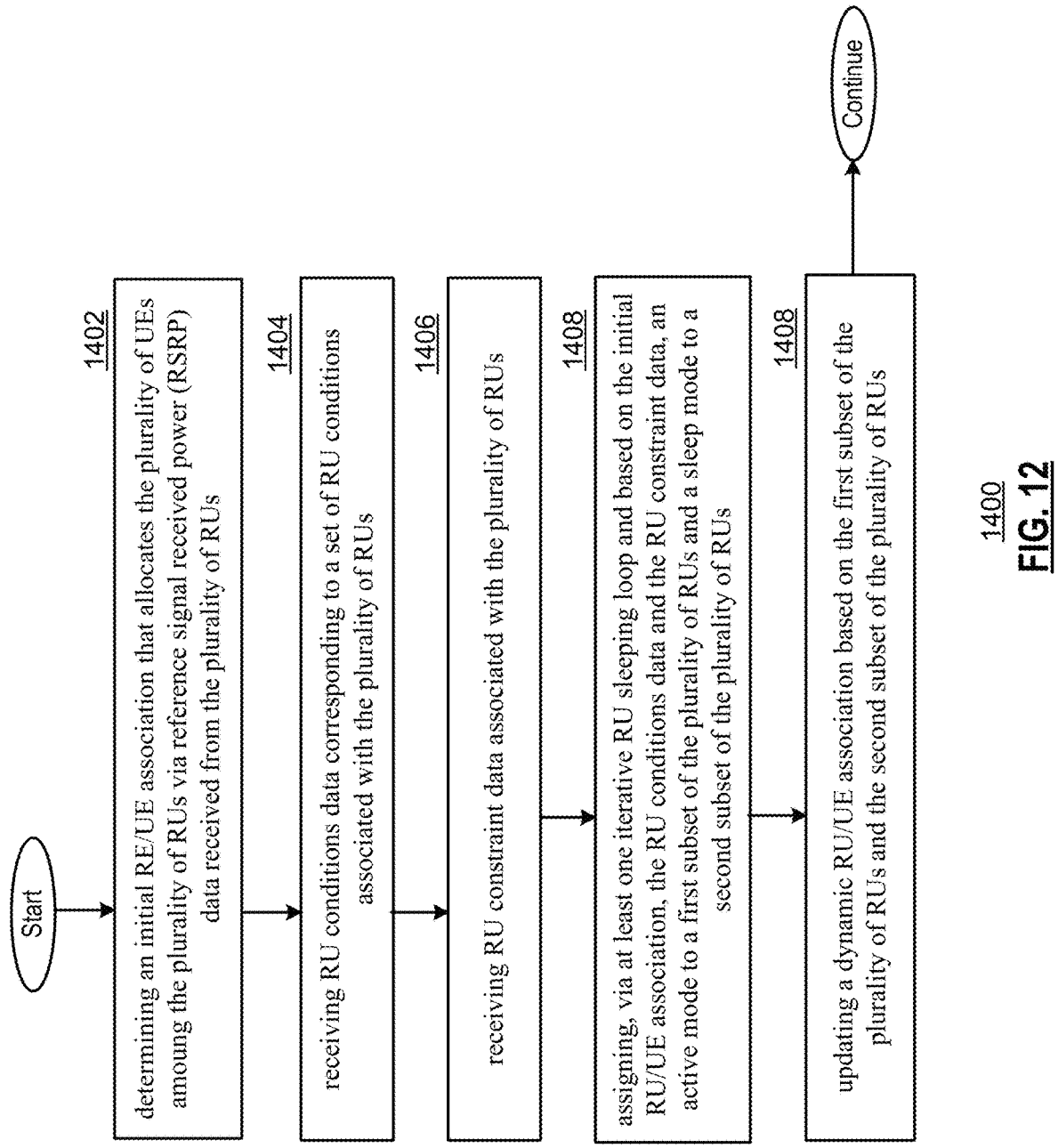
FIG. 12 illustrates a flow diagram of an example method.

FIG. 12 illustrates a flow diagram 1400 of an example method. In particular, a method is presented for use with one or more functions or features described in conjunction with FIGS. 1-11 Furthermore, a method is presented for use in a radio access network (RAN that includes a RAN controller), such as the centralized RAN controller of FIG. 1, and a plurality of radio units (RUs) of a cell-less radio access network that are configured to engage in wireless communications with a plurality of user equipment (UEs) via at least one radio channel of the cell-less RAN. Step 1402 includes determining an initial RU/UE association that allocates the plurality of UEs among the plurality of RUs via reference signal received power (RSRP) data received from the plurality of RUs. Step 1404 includes receiving RU conditions data corresponding to a set of RU conditions associated with the plurality of RUs. Step 1406 includes receiving RU constraint data associated with the plurality of RUs. Step 1408 includes assigning, via at least one iterative RU sleeping loop and based on the initial RU/UE association, the RU conditions data and the RU constraint data, an active mode to a first subset of the plurality of RUs and a sleep mode to a second subset of the plurality of RUs. Step 1410 includes updating a dynamic RU/UE association based on the first subset of the plurality of RUs and the second subset of the plurality of RUs.

In addition or in the alternative to any of the foregoing, the RAN has an open architecture that is disaggregated and includes at least one of: a centralized unit (CU) or a distributed unit (DU).

In addition or in the alternative to any of the foregoing, the RSRP data is received from the plurality of RUs via a CU or a DU.

In addition or in the alternative to any of the foregoing, the at least one iterative RU sleeping loop dynamically determines the first subset and the second subset for each transmission time interval (TTI) of the RAN.

In addition or in the alternative to any of the foregoing, the dynamic RU/UE association is updated on a TTI basis.

In addition or in the alternative to any of the foregoing, updating the dynamic RU/UE association based on the first subset of the plurality of RUs and the second subset of the plurality of RUs includes reassigning UEs from the initial RU/UE association allocated to one of the second subset of the plurality of RUs to one of the first subset of the plurality of RUs.

In addition or in the alternative to any of the foregoing, reassigning the UEs from the initial RU/UE association allocated to one of the second subset of the plurality of RUs to one of the first subset of the plurality of RUs is based on the RSRP data.

In addition or in the alternative to any of the foregoing, the at least one iterative RU sleeping loop includes a non-conditional sleeping loop that generates network load data and assigns ones of the plurality of RUs to the first subset based on a comparison of the load data to load criteria.

In addition or in the alternative to any of the foregoing, the at least one iterative RU sleeping loop includes a non-conditional sleeping loop that assigns ones of the plurality of RUs to the first subset based on a comparison of the RSRP data to RSRP criteria.

In addition or in the alternative to any of the foregoing, the at least one iterative RU sleeping loop assigns ones of the plurality of RUs to the first subset based on a comparison of an interference contribution parameter to an average interference contribution.

In addition or in the alternative to any of the foregoing, the at least one iterative RU sleeping loop includes a non-conditional sleeping loop that assigns ones of the plurality of RUs to the first subset based on a comparison of an interference contribution parameter to an average interference contribution.

In addition or in the alternative to any of the foregoing, the at least one iterative RU sleeping loop further includes a conditional sleeping loop that assigns ones of the plurality of RUs to the second subset based on the comparison of the interference contribution parameter to the average interference contribution, only when the ones of the plurality of RUs fail to satisfy a network energy efficiency criteria.

In addition or in the alternative to any of the foregoing, the at least one iterative RU sleeping loop further includes a conditional sleeping loop that assigns ones of the plurality of RUs to the second subset based on the comparison of an interference contribution parameter to an average interference contribution, only when the ones of the plurality of RUs fail to satisfy a minimum energy efficiency criteria.

In addition or in the alternative to any of the foregoing, the at least one iterative RU sleeping loop further includes a conditional sleeping loop that computes a network throughput and proceeds to a next iteration based on the network throughput and a baseline throughput.

In addition or in the alternative to any of the foregoing, the method is implemented via the RAN controller that includes a network interface, a memory that stores operational instructions corresponding to a sleep mode control application and a processor that executes the operational instructions to perform the steps of the method.

V. Conclusion

This disclosure presents an energy efficient sleep mode scheme (3×E) that carefully selects inefficient RUs and make those sleep in order to enhance energy efficiency in 5G and beyond 5G cell-less RAN. The proposed scheme manages the interference in a way to increase the transmission rate per energy unit. To provide a stable performance enhancement in networks with a higher user density, the interference contribution of each RU is considered in the sleeping criteria. The customized criteria result in an energy efficient decision on sleeping RUs, regardless of the load of the network. Considering the network EE as the main objective function, one or more embodiments makes a conditional sleeping mode loop for RUs to guarantee the EE enhancement. The conditional interference mitigation in various embodiments would control the lower populated networks' EE even if the distributed load within RUs are temporarily meeting the configuration thresholds. It means that the RUs with sufficient load would also go through the EE conditions.

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. The processing module, module, processing circuit, processing circuitry, and/or processing unit can further include one or more interface devices for communicating data, signals and/or other information between the components of the processing module and further for communicating with other devices. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks (FIG. 5, 6, Or 7) may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art can also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the examples. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, GIGABYTES, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

While particular combinations of various functions and features of the one or more examples have been expressly described herein, other combinations of these features and functions are likewise possible. One or more embodiments is not limited by the particular examples disclosed herein and expressly incorporates these other combinations.

What is claimed is:

1. A method for use in a radio access network (RAN) that includes a RAN controller and a plurality of radio units (RUs) of a cell-less radio access network that are configured to engage in wireless communications with a plurality of user equipment (UEs) via at least one radio channel of the cell-less RAN, the method comprising:
    determining an initial RU/UE association that allocates the plurality of UEs among the plurality of RUs via reference signal received power (RSRP) data received from the plurality of RUs;
    receiving RU conditions data corresponding to a set of RU conditions associated with the plurality of RUs;
    receiving RU constraint data associated with the plurality of RUs;
    assigning, via at least one iterative RU sleeping loop and based on the initial RU/UE association, the RU conditions data and the RU constraint data, an active mode to a first subset of the plurality of RUs and a sleep mode to a second subset of the plurality of RUs; and
    updating a dynamic RU/UE association based on the first subset of the plurality of RUs and the second subset of the plurality of RUs.

2. The method of claim 1, wherein the RAN has an open architecture that is disaggregated and includes at least one of: a centralized unit (CU) or a distributed unit (DU).

3. The method of claim 2, wherein the RSRP data is received from the plurality of RUs via a CU or a DU.

4. The method of claim 1, wherein the at least one iterative RU sleeping loop dynamically determines the first subset and the second subset for each transmission time interval (TTI) of the RAN.

5. The method of claim 4, wherein the dynamic RU/UE association is updated on a TTI basis.

6. The method of claim 1, wherein updating the dynamic RU/UE association based on the first subset of the plurality of RUs and the second subset of the plurality of RUs includes reassigning UEs from the initial RU/UE association allocated to one of the second subset of the plurality of RUs to one of the first subset of the plurality of RUs.

7. The method of claim 6, wherein reassigning the UEs from the initial RU/UE association allocated to one of the second subset of the plurality of RUs to one of the first subset of the plurality of RUs is based on the RSRP data.

8. The method of claim 1, wherein the at least one iterative RU sleeping loop includes a non-conditional sleeping loop that generates network load data and assigns ones of the plurality of RUs to the first subset based on a comparison of the load data to load criteria.

9. The method of claim 1, wherein the at least one iterative RU sleeping loop includes a non-conditional sleeping loop that assigns ones of the plurality of RUs to the first subset based on a comparison of the RSRP data to RSRP criteria.

10. The method of claim 1, wherein the at least one iterative RU sleeping loop assigns ones of the plurality of RUs to the first subset based on a comparison of an interference contribution parameter to an average interference contribution.

11. The method of claim 1, wherein the at least one iterative RU sleeping loop includes a non-conditional sleeping loop that assigns ones of the plurality of RUs to the first subset based on a comparison of an interference contribution parameter to an average interference contribution.

12. The method of claim 11, wherein the at least one iterative RU sleeping loop further includes a conditional sleeping loop that assigns ones of the plurality of RUs to the second subset based on the comparison of the interference contribution parameter to the average interference contribution, only when the ones of the plurality of RUs fail to satisfy a network energy efficiency criteria.

13. The method of claim 11, wherein the at least one iterative RU sleeping loop further includes a conditional sleeping loop that assigns ones of the plurality of RUs to the second subset based on the comparison of an interference contribution parameter to an average interference contribution, only when the ones of the plurality of RUs fail to satisfy a minimum energy efficiency criteria.

14. The method of claim 11, wherein the at least one iterative RU sleeping loop further includes a conditional sleeping loop that computes a network throughput and proceeds to a next iteration based on the network throughput and a baseline throughput.

15. The method of claim 1, wherein assigning, via the at least one iterative sleeping loop, the active mode to the first subset of the plurality of RUs and the sleep mode to the second subset of the plurality of RUs is further based on one or more of: a priority policy configuration, a scheduler selection, a KPI objective, a decision making priority, a scheduling status, a UE QoS, a Carrier/Radio characteristic, an EE/EC measurement report, load statistics per coverage area and per carrier, UE mobility information that includes coverage area, UE mobility information that includes beam level measurements, power consumption measurements, or geolocation information.

16. A radio access network (RAN) controller for use with a plurality of radio units (RUs) of a cell-less RAN that are configured to engage in wireless communications with a plurality of user equipment (UEs) via at least one radio channel of the cell-less RAN, wherein the RAN controller comprises:
a network interface;
a memory configured to store operational instructions corresponding to a sleep mode control application; and
at least one processor configured to execute the operational instructions, wherein the operational instructions, when executed, cause the at least one processor to perform operations that include:
determining an initial RU/UE association that allocates the plurality of UEs among the plurality of RUs via reference signal received power (RSRP) data received from the plurality of RUs;
receiving RU conditions data corresponding to a set of RU conditions associated with the plurality of RUs;
receiving RU constraint data associated with the plurality of RUs;
assigning, via at least one iterative RU sleeping loop and based on the initial RU/UE association, the RU conditions data and the RU constraint data, an active mode to a first subset of the plurality of RUs and a sleep mode to a second subset of the plurality of RUs; and
updating a dynamic RU/UE association based on the first subset of the plurality of RUs and the second subset of the plurality of RUs.

17. The RAN controller of claim 16, wherein the at least one iterative RU sleeping loop includes a non-conditional sleeping loop that assigns ones of the plurality of RUs to the first subset based on a comparison of an interference contribution parameter to an average interference contribution.

18. The RAN controller of claim 17, wherein the at least one iterative RU sleeping loop further includes a conditional sleeping loop that assigns ones of the plurality of RUs to the second subset based on the comparison of the interference contribution parameter to the average interference contribution, only when the ones of the plurality of RUs fail to satisfy a network energy efficiency criteria.

19. The RAN controller of claim 17, wherein the at least one iterative RU sleeping loop further includes a conditional sleeping loop that assigns ones of the plurality of RUs to the second subset based on the comparison of an interference contribution parameter to an average interference contribution, only when the ones of the plurality of RUs fail to satisfy a minimum energy efficiency criteria.

20. The RAN controller of claim 17, wherein the at least one iterative RU sleeping loop further includes a conditional sleeping loop that computes a network throughput and proceeds to a next iteration based on the network throughput and a baseline throughput.

* * * * *

UNITED STATES PATENT AND TRADEMARK OFFICE
CERTIFICATE OF CORRECTION

| | | |
|---|---|---|
| PATENT NO. | : 12,068,800 B2 | Page 1 of 1 |
| APPLICATION NO. | : 18/484821 | |
| DATED | : August 20, 2024 | |
| INVENTOR(S) | : Farinaz Kooshki et al. | |

It is certified that error appears in the above-identified patent and that said Letters Patent is hereby corrected as shown below:

On the Title Page

Item (73) Assignee: Please replace "ISAD Sp. z o.o, Piaseczno (PL)" with --ISRD Sp. z o.o, Piaseczno (PL)--

Signed and Sealed this
Twenty-fourth Day of December, 2024

Derrick Brent
*Acting Director of the United States Patent and Trademark Office*